United States Patent [19]

Kato

[11] Patent Number: 4,817,017

[45] Date of Patent: Mar. 28, 1989

[54] INDUSTRIAL ROBOT

[75] Inventor: Hisao Kato, Inazawa, Japan

[73] Assignee: Mitsubishi Denki Kabushiki Kaisha, Japan

[21] Appl. No.: 169,122

[22] Filed: Mar. 9, 1988

Related U.S. Application Data

[63] Continuation of Ser. No. 848,146, Apr. 4, 1986, abandoned.

[30] Foreign Application Priority Data

Apr. 8, 1985 [JP] Japan ................................. 60-72775
Apr. 8, 1985 [JP] Japan ................................. 60-72776

[51] Int. Cl.$^4$ ............................................ B25J 15/00
[52] U.S. Cl. .................................. 364/513; 364/192; 901/5; 901/7
[58] Field of Search ................. 364/513, 191–193, 364/474, 478; 318/568; 901/1–7, 41, 42, 50

[56] References Cited

U.S. PATENT DOCUMENTS

| | | | |
|---|---|---|---|
| 4,456,961 | 6/1984 | Price et al. | 364/513 |
| 4,495,588 | 1/1985 | Nio et al. | 364/513 |
| 4,517,653 | 5/1985 | Tsuchihashi et al. | 364/513 |
| 4,602,345 | 7/1986 | Yokoyama | 364/513 |
| 4,613,943 | 9/1986 | Miyake et al. | 364/513 |
| 4,615,093 | 10/1986 | Tews et al. | 29/407 |
| 4,665,493 | 5/1987 | Hattori | 364/474 |
| 4,706,204 | 11/1987 | Hattori | 364/513 |

Primary Examiner—Allen MacDonald
Attorney, Agent, or Firm—Leydig, Voit & Mayer

[57] ABSTRACT

In an industrial robot according to this invention, at least three points among a large number of off-line teaching points set for tasks are directly taught in the actual site of the tasks, the "deviations" between the actual teaching points and the off-line set teaching points respectively corresponding to each other are computed in directions X, Y and Z, and all the large number of off-line teaching points are corrected on the basis of the errors detected for at least the three points.

6 Claims, 7 Drawing Sheets

INDUSTRIAL ROBOT

This application is a continuation of application Ser. No. 848,146, filed Apr. 4, 1986 now abandoned.

BACKGROUND OF THE INVENTION

This invention relates to an industrial robot which can automatically correct the "deviations" of a large number of teaching points so as to perform accurate tasks.

For example, in a case where workpieces arrayed on a conveyor are subjected to predetermined spot welding tasks by an industrial robot, an expedient is employed in which, before the tasks, the plurality of workpieces are actually arrayed on the conveyor and the positions thereof are taught to the robot. On account of an inferior job environment, however, it is unfavorable for safety that such a teaching operation is conducted in a production line.

As an expedient for coping with this drawback, there is a method wherein using, for example, a programming device installed in a safe place remote from a production line, such as a design room, information items such as "the position of a conveyor", "the positions of workpieces", "the shapes of workpieces", "the position of a robot", and "teaching points" are input to teach the motion of the robot in an off-line fashion, and these overall information items are loaded in the robot so as to cause the robot to perform predetermined tasks.

Since, however, the aforementioned off-line "position of the conveyor", "positions of the workpieces", "position of the robot" etc. inevitably involve errors relative to actual positions, the teaching points for the respective workpieces on the conveyor deviate. This leads to the disadvantage that the spot welding, for example, cannot be performed for the workpieces.

As another example, a workpiece is successively moved to a plurality of machine tools or workbenches by a single industrial robot. In such a case, a large number of teaching points must be set on the machine tools or workbenches before the tasks. However, the relative positions (positions in directions X, Y and Z) of the individual machine tools or workbenches often deviate relative to preset positions. Therefore, when the aforementioned series of tasks are taught in off-line fashion under such a state and the corresponding information is loaded in the robot, it is inevitably impossible to carry out the normal tasks. Accordingly, the "deviations" of the teaching points need to be corrected.

However, even when the "deviations" of the teaching points have been corrected for one of the machine tools or workbenches, the teaching points for this machine tool or workbench deviate because the other machine tools or workbenches are not installed on their preset positions. After all, the series of tasks are impossible.

SUMMARY OF THE INVENTION

This invention has for its object to provide an industrial robot according to which, if a large number of teaching points concerning predetermined tasks involve errors, they can be automatically corrected so as to perform the tasks at precise positions.

With the industrial robot according to this invention, at least three points among a large number of off-line teaching points set for tasks are directly taught in the actual site of the tasks, the "deviations" between the actual teaching points and the off-line set teaching points respectively corresponding to each other are computed in directions X, Y and Z, and all the large number of off-line teaching points are corrected on the basis of the errors detected for at least the three points.

In this invention, the "deviations" of all the large number of off-line set teaching points can be automatically corrected merely by directly teaching the several typical places among the task positions, whereby accurate tasks can be carried out.

BRIEF DESCRIPTION OF THE DRAWINGS

FIGS. 1-8 illustrate an embodiment of an industrial robot according to this invention, wherein

FIGS. 9-12 illustrate an alternative embodiment of this invention, wherein

DESCRIPTION OF THE PREFERRED EMBODIMENTS

FIGS. 1-8 all illustrate an embodiment of this invention.

Figure 1:
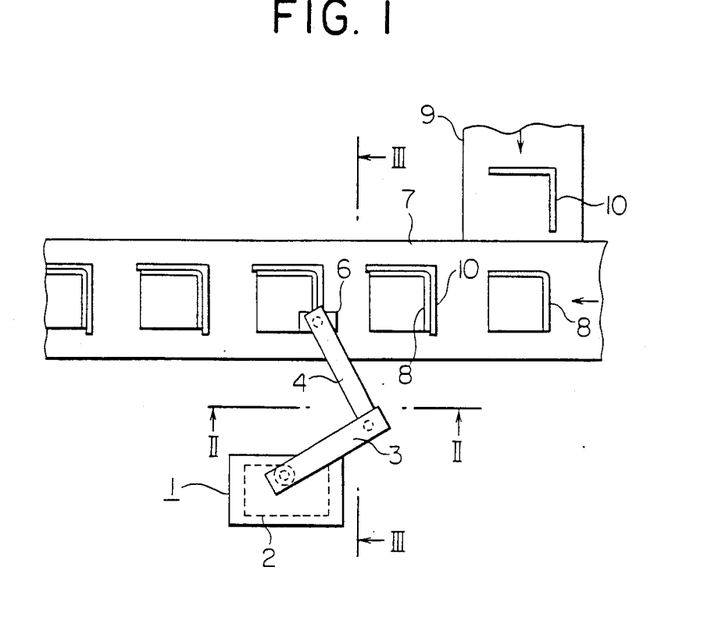
FIG. 1 is a plan view of a production line which is served by the industrial robot.
Figure 2:
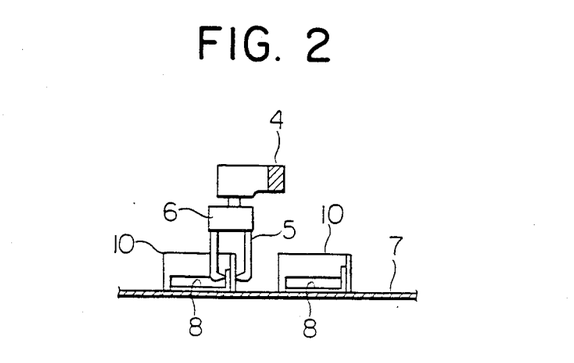
FIG. 2 is a sectional view taken along line (II)—(II) in FIG. 1.
Figure 3:
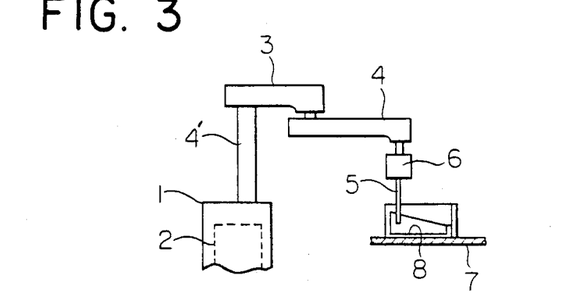
FIG. 3 is a sectional view taken along line (III)—(III) in FIG. 1.
Figure 4:
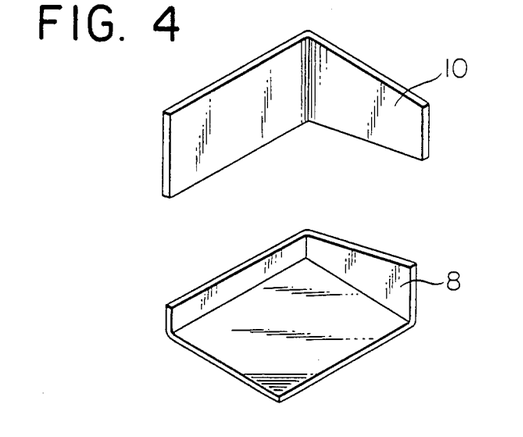
FIG. 4 is a perspective view separately showing an A-workpiece and a B-workpiece which are to be welded to each other.
Figure 5:
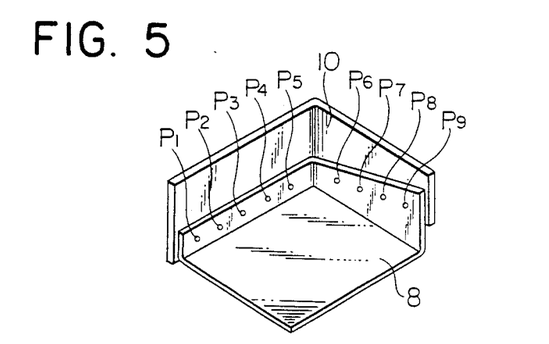
FIG. 5 is a perspective view showing the plurality of spot welding points of the A-workpiece and the B-workpiece.

Referring first to FIGS. 1-4, numeral 1 designates a robot proper in which a control device 2 having memory means is received. A first arm 3 is turnably mounted on the upper end of a strut 4' which is free to ascend and descend, while a second arm 4 is turnably mounted on the free end of the first arm 3. Attached to the free end of the second arm 4 is a hand device 6 which has a pair of electrodes 5 free to open and close and which performs spot welding. A first conveyor 7 is disposed near the robot proper 1 and intermittently conveys a plurality of A-workpieces 8 at predetermined intervals, while a second conveyor 9 intersects the first conveyor 7 orthogonally, feeds a plurality of B-workpieces 10 to the first conveyor 7 and unites the B-workpiece 10 with the aforementioned A-workpiece 8 in a position of predetermined relationship as shown in FIGS. 1 and 2. Further, FIG. 5 shows spot welding points $P_1$-$P_9$ at which the overlap parts of the A-workpiece 8 and the B-workpiece 10 united in the predetermined relative position are spot-welded to each other by the electrodes 5 of the hand device 6. The spot welding points are set by off-line teaching information 15.

Figure 6:
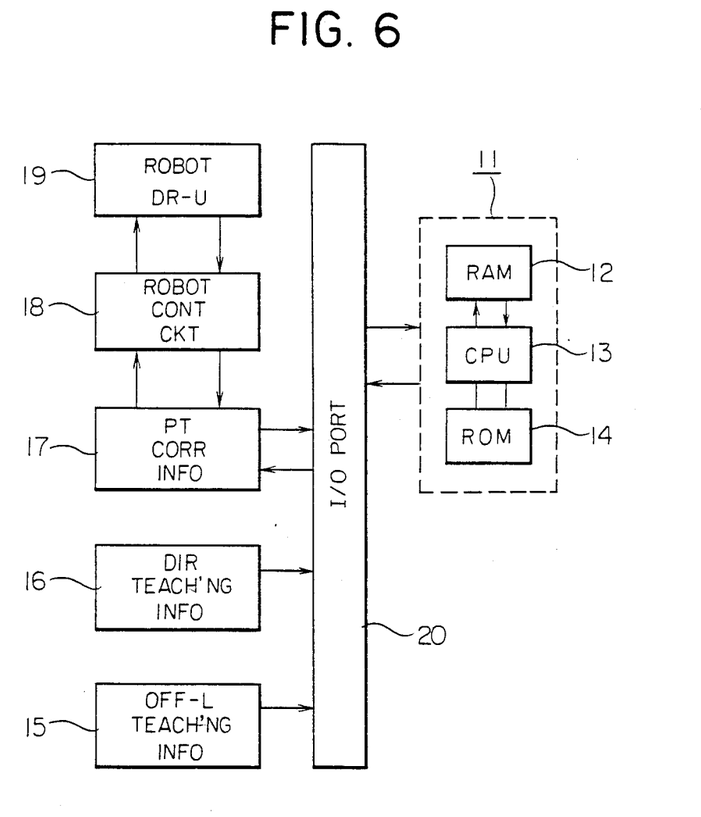
FIG. 6 is an electric circuit block diagram of the industrial robot of this invention.

Next, in an electric circuit block diagram of FIG. 6, numeral 11 designates a computer which is included in the control device 2 and which is constructed of a RAM (random access memory) 12, a CPU (central processing unit) 13 and a ROM (read only memory) 14. This computer 11 stores a program for the movement of the robot and the point information taught in off-line fashion, and has the functions of automatically comparing direct teaching information with the off-line taught point information and correcting points in the presence of differences.

The off-line teaching information 15 mentioned above is information obtained in such a way that the absolute spot welding points $P_1$–$P_9$ with respect to the designed absolute positions of the robot proper 1, the conveyors 7, 9 and the A- and B-workpieces 8, 10, in other words, the moving directions X, Y and Z of the hand device 6 and the rotational angle $\theta$ of the hand device 6 are taught in a place away from a production line.

On the other hand, the direct teaching information 16 is information obtained in such a way that the tips of the electrodes 5 of the hand device 6 are moved to the predetermined spot welding points $P_1$–$P_9$ of the A- and B-workpieces 8, 10 on the conveyors 7, 9, and that among the spot welding points $P_1$–$P_9$, a smaller number of four spot welding points $P_1$, $P_5$, $P_6$ and $P_9$ are taught.

Although the above embodiment has been described as to the case of directly teaching the four spot welding points $P_1$, $P_5$, $P_6$ and $P_9$, at least three spot welding points may be selected in the place remote from the production line so that the whole positional deviation between the A- and B-workpieces 8 and 10 can be decided.

In a case where the off-line teaching information 15 and the direct teaching information 16 are compared and where both these information 15 and 16 involve the "deviation", all the off-line teaching information items 15 are computed by the computer 11 so as to prepare point correction information 17, into which the off-line teaching points are corrected.

Next, a robot control circuit 18 and a robot drive unit 19 are disposed for controlling and driving the robot proper 1 by the use of the computer 11 and the point correction information 17. Shown at numeral 20 is an I/O (Input/Output) port which is a relay point for connecting the computer 11 and the information items 15, 16 and 17 to each other.

Figure 8:
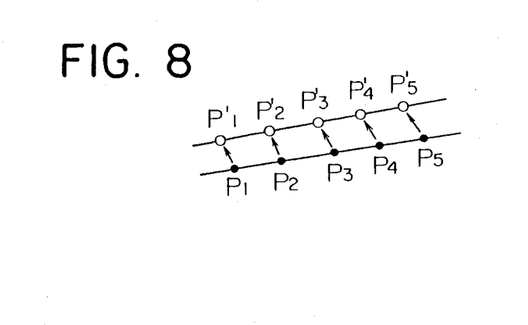
FIG. 8 is a diagram for explaining the operation of correcting teaching points for a workpiece.

The industrial robot of this invention is constructed as thus far described. The operation of correcting the teaching points for the workpieces will be described below with reference to FIG. 8. It is now assumed that the spot welding points $P_1$ and $P_5$ on one side have been obtained as the off-line teaching information 15, while spot welding points $P_1'$ and $P_5'$ on the other side have been obtained as the direct teaching information 16. Then, the computer 11 alters the moving directions X, Y and Z of the hand device 6 as follows:

$P_1 (X_1, Y_1, Z_1) \rightarrow P_1' (X_1', Y_1', Z_1')$ $P_5 (X_5, Y_5, Z_5) \rightarrow P_5' (X_5', Y_5', Z_5')$ The spot welding points $P_2$, $P_3$ and $P_4$ which are intermediate between the spot welding points $P_1$ and $P_5$ are altered by the proportional computations of the computer 11 as follows:

$P_2 \rightarrow P_2'$ $P_3 \rightarrow P_3'$ $P_4 \rightarrow P_4'$

Figure 7:
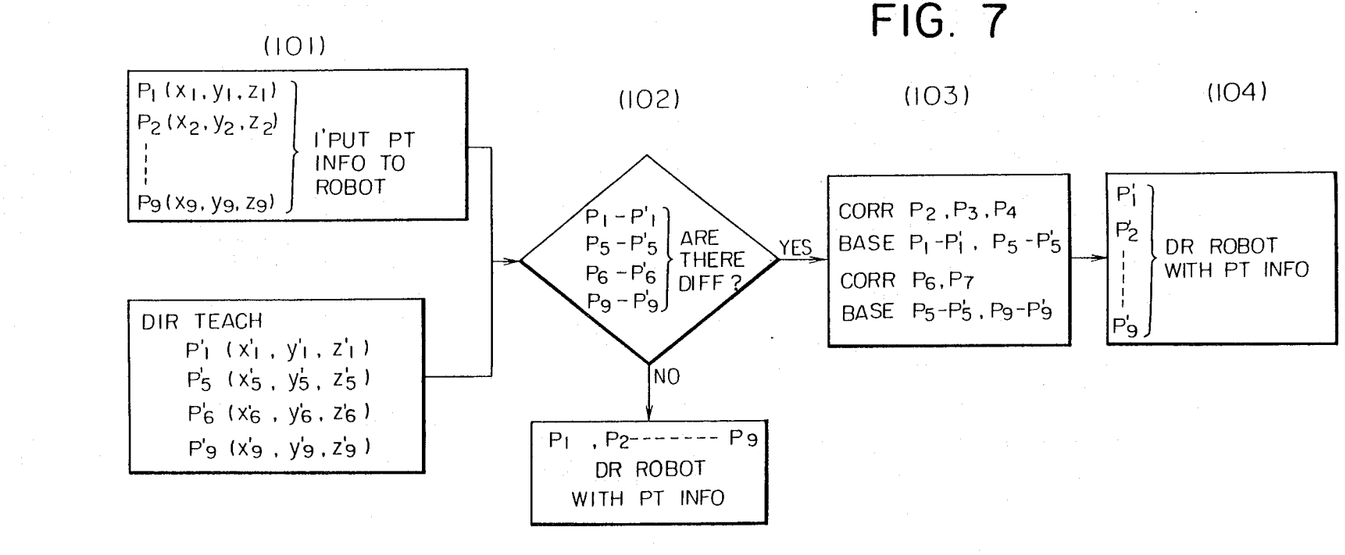
FIG. 7 is a flow chart for explaining the operation of the industrial robot of this invention.

Next, the welding operation of the industrial robot of this invention will be described with reference to a flow chart of FIG. 7. At a step 101, all the spot welding points $P_1$–$P_9$ are input to the computer 11 as the off-line teaching information 15. At the subsequent step 102, spot welding points $P_1'$, $P_5'$, $P_6'$ and $P_9'$ by way of example are input to the computer 11 as the direct teaching information 16. At the succeeding step 103, the off-line teaching information 15 and the direct teaching information 16 are compared by the computer 11. In the absence of the "deviation" between both the information items 15 and 16, the spot welding tasks of the off-line teaching spot welding points $P_1$–$P_9$ are performed at the succeeding step 104. It is needless to say that, in the presence of the "deviation" at the stage of the comparisons between both the information items 15 and 16, the spot welding points $P_1$–$P_9$ are corrected to $P_1'$–$P_9'$ by the correcting operation stated above, whereupon the spot welding tasks of the new spot welding points $P_1'$–$P_9'$ are performed.

While, in the foregoing embodiment, the overlap parts of the A-workpiece 8 and the B-workpiece 10 to be spot-welded to each other have been described to be flat as shown in FIG. 5, a similar effect is achieved even when they are corrugated.

FIGS. 9–12 all illustrate another embodiment of this invention.

Figure 9:
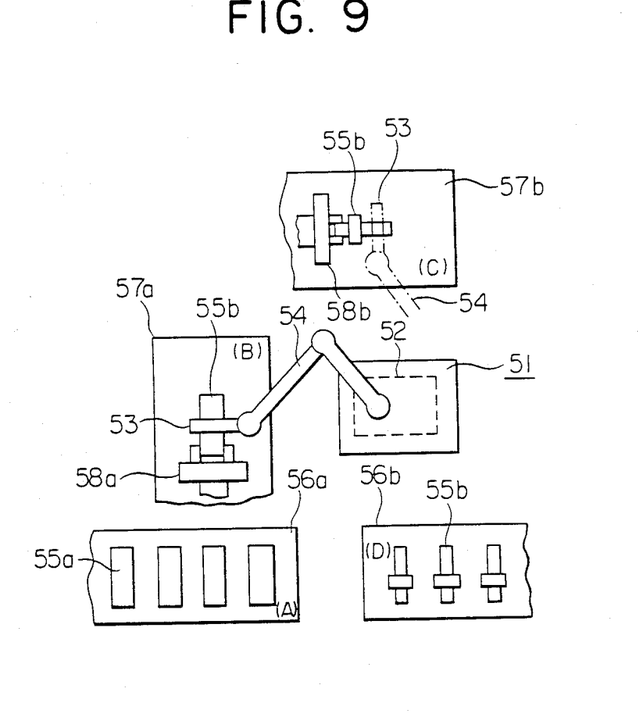
FIG. 9 is a plan view showing a single industrial robot and a plurality of machine tools or workbenches.

First, in FIG. 9, numeral 51 designates a robot proper in which a control device 52 having memory means is received. A hand device 53 is mounted on the free end of an arm 54 which is attached to the robot proper 51 in a manner free to ascend and descent and to turn. This hand device 53 is provided with a pair of grip claws (not shown) which grasp and release an unprocessed workpiece 55a or a processed workpiece 55b. Symbol 56a denotes a workpiece feed bed on which the unprocessed workpieces 55a are placed, while symbol 56b denotes a workpiece conveyance bed on which the processed workpieces 55b are placed. Symbols 57a and 57b denote first and second machine tools or workbenches by or on which the unprocessed workpieces 55a transferred thereto by the hand device 53 of the arm 54 of the robot proper 51 are processed, respectively. The unprocessed workpiece 55a is subjected to primary working by or on the first machine tool or workbench 57a, and is subsequently subjected to secondary working by or on the second machine tool or workbench 57b. Thereafter, the processed workpiece 55b is transferred to the workpiece conveyance bed 56b.

In a case where the first and second machine tools or workbenches 57a and 57b are machine tools, they are respectively provided with chucks 58a and 58b each of which holds the workpiece for the machining thereof. In addition, the workpiece feed bed 56a, the workpiece conveyance bed 56b, and the first and second machine tools or workbenches 57a and 57b construct teaching blocks A–D, respectively.

Figure 10:
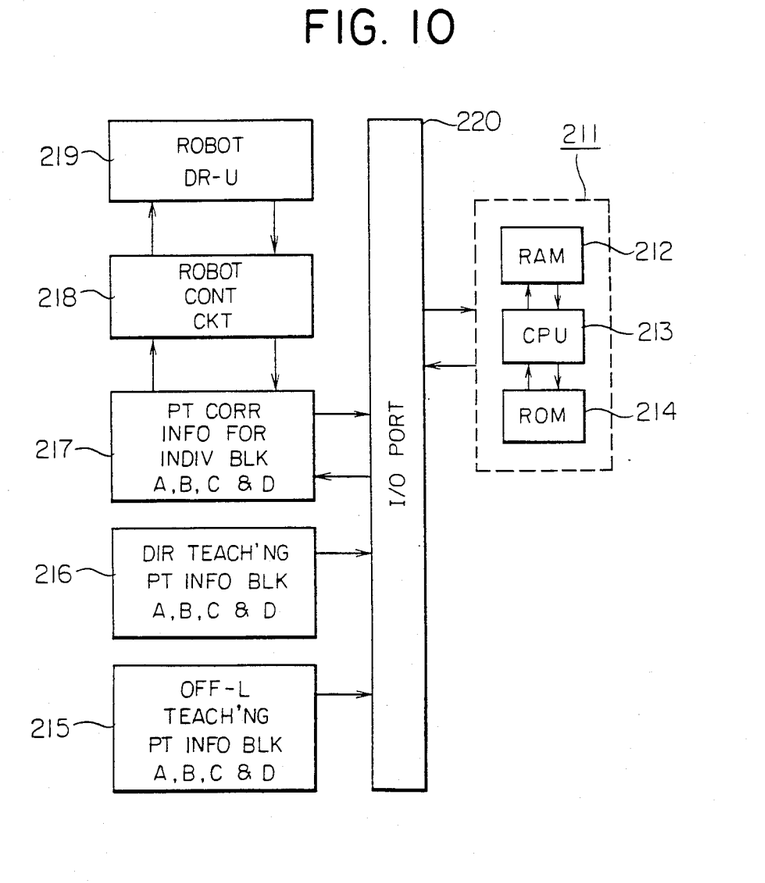
FIG. 10 is an electric circuit block diagram of the industrial robot of this invention.

Next, in an electric circuit block diagram of FIG. 10, numeral 211 designates a computer which is included in the control device 52 and which is constructed of a RAM (random access memory) 212, a CPU (central processing unit) 213 and a ROM (read only memory) 214. This computer 211 stores a program for the movement of the robot and point information taught in off-line fashion, and has the functions of automatically comparing direct teaching information with the off-line taught point information and correcting points in the presence of differences.

The off-line teaching point information 215 is obtained in such a way that absolute positions are taught in a place remote from the production line for each of the blocks A-D of the workpiece feed bed 56a, the workpiece conveyance bed 56b, and the first and second machine tools or workbenches 57a and 57b. Numeral 216 indicates direct teaching point information which is obtained in such a way that the workpiece 55i a or 55b is grasped by the hand device 53 at only several essential points among the points of the off-line teaching point information items 215 taught for each of the blocks A-D, and that the grasped positions are directly taught. As the essential points, at least three points should better be selected in the place away from the production line so that the direct teaching point information items 216 can have their positional deviations from the off-line teaching point information items 215 decided for each of the blocks A-D.

In a case where the off-line teaching point information 215 and the direct teaching point information 216 are compared for each of the blocks A-D and where both these information 215 and 216 involve the "deviation", all the off-line teaching point information items 215 are computed by the computer 211 so as to prepare point correction information 217, into which the off-line teaching point information is corrected.

Next, a robot control circuit 218 and a robot drive unit 219 are disposed for controlling and driving the robot proper 51 by the use of the computer 211 and the point correction information items 217 for the individual blocks A, B, C and D. Shown at numeral 220 is an I/O (Input/Output) port which is a relay point for interconnecting the computer 211 and the information items 215, 216 and 217.

The industrial robot of this invention is constructed as thus far described. The operation of correcting the teaching points for the workpiece 55a on the workpiece feed bed 56a, namely, on the block A will be described below with reference to FIG. 12.

Figure 12:
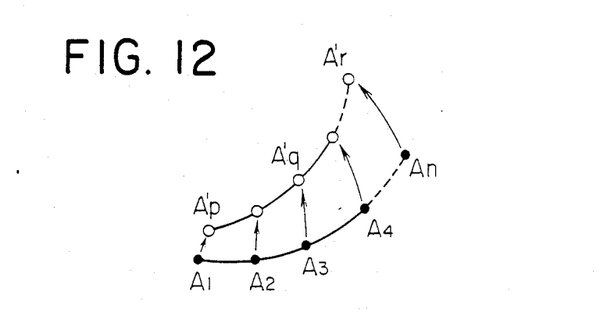
FIG. 12 is a diagram for explaining the operation of correcting teaching points for a workpiece.

Now, it is assumed by way of example that there be off-line teaching point information items 215 of $A_1$ $(XA_1, YA_1, ZA_1) - A_n(XA_n, YA_n, ZA_n)$, and that separately from them, the direct teaching point information items 216 corresponding to the items $A_1$, $A_3$ and $A_n$ of the off-line teaching point information 215, namely, $A'_p (X'A_p, Y'A_p, Z'A_p)$ $A'_q (X'A_q, Y'A_q, Z'A_q)$ $A'_r (X'A_r, Y'A_r, Z'A_r)$ have been obtained. Then, the positional information items are of course corrected as follows:

$A_1 \rightarrow A'_p$ $A_3 \rightarrow A'_q$ $A_n \rightarrow A'_r$

Besides, the intermediate items $A_2, A_4, \ldots$ and $A_{n-1}$ of the off-line teaching point information 215 are corrected and altered by the proportional computations of the computer 211. Likewise to the block A described above, the other blocks B, C and D are also subjected to corrections. This teaching mode of correcting the "deviations" of the teaching points for each of the blocks A, B, C and D is called the 'single off-line teaching unit'.

Figure 11:
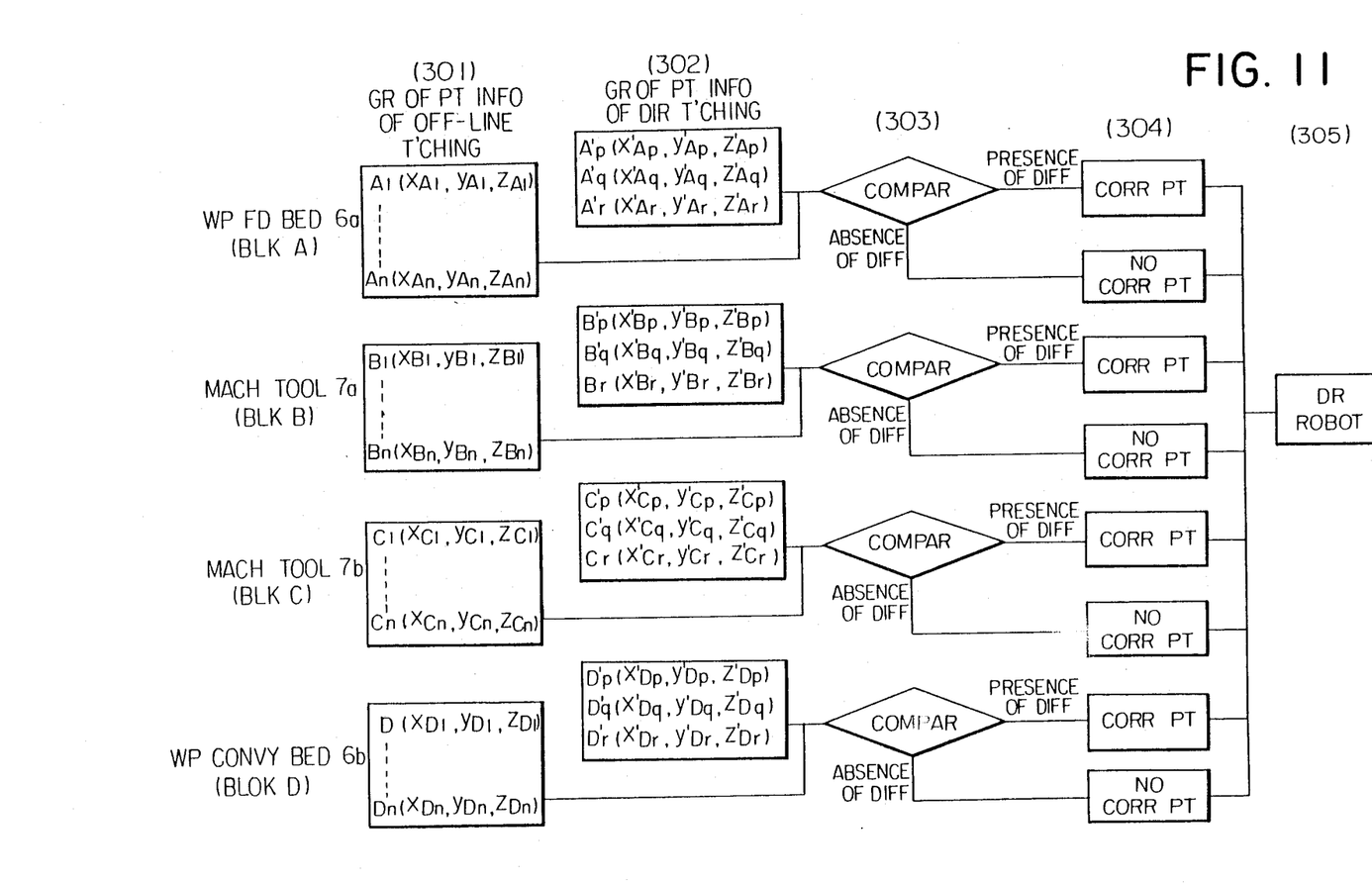
FIG. 11 is a flow chart for explaining the operation of the industrial robot of this invention.

Next, the operation of the industrial robot of this invention will be described as to the block A with reference to a flow chart of FIG. 11. At a step 301, all the items $A_1-A_n$ of the off-line teaching point information 215 are input to the computer 211. At the subsequent step 302, the direct teaching point information items 216 corresponding to some of the points of the items $A_1-A_n$ of the off-line teaching point information 215 are input to the computer 211. At the succeeding step 303, the off-line teaching point information 215 and the direct teaching point information 216 are compared by the computer 211. In the absence of the "deviation" between both the information items 215 and 216, the robot stands by. In the presence of the "deviation" between both the information items 215 and 216, the off-line teaching point information items $A_1-A_n$ are corrected into the point correction information items $A'_1-A'_n$ in accordance with the foregoing gist at a step 304.

After the correcting operations stated before are also performed for the other blocks B, C and D in accordance with the single off-line teaching unit, the control flow shifts to a step 305 at which the robot is driven.

As thus far described, according to this invention, several typical points among a large number of off-line teaching points are directly taught, the "deviations" between the direct teaching points and the corresponding off-line teaching points are detected, and errors are automatically corrected on the basis of the deviations. The invention therefore has the excellent effect that accurate tasks can be always carried out with the simple operation of the direct teaching of the several points.

What is claimed is:

1. In combination:
   a plurality of workpieces;
   a stationary industrial robot mounted at a fixed location comprising an actual site for performing predetermined tasks on said workpieces;
   a movable workpiece support which carries each workpiece to said stationary robot; and
   an improved control system for said robot, comprising:
   (a) first memory means for storing information representative of a plurality of teaching points taught in an off-line environment different from the actual task site for performing the predetermined tasks,
   (b) second memory means for storing information representative of actual points which correspond to predetermined points of the plurality of teaching points, the actual point information being taught at the actual task site and representing fewer points than the teaching points,
   (c) comparison means for comparing the actual point information stored in said second memory means and the corresponding teaching point information stored in said first memory means and for detecting differences between the actual point information and the corresponding teaching point information, (d) correction means
  (i) for correcting the teaching point information corresponding to the actual points on the basis of the differences detected by said comparison means, and
  (ii) for correcting the teaching point information for teaching points not having a corresponding actual point on the basis of a calculation based on the differences detected by said comparison means, and
(e) third memory means for storing the teaching point information corrected by said correction means, and for outputting the corrected teaching point information in order to execute the predetermined tasks.

2. The combination according to claim 1 wherein the actual point information to be stored in said second memory means corresponds to at least three separate teaching points among the plurality of teaching points whose representative information is stored in said first memory means.

3. The combination according to claim 2 wherein said correction means performs the correcting operations for all the points lying between first and second points of the three teaching points on the basis of the errors of the first and second teaching points among the errors concerning the representative information of the three teaching points and performs the correcting operations for all the points lying between the second and third teaching points on the basis of the errors of the second and third teaching points.

4. The combination according to claim 1 wherein said control system further comprises means for performing the predetermined tasks in a plurality of task blocks, and wherein said correction means includes means for correcting the teaching point information of said first memory means for each of the plurality of task blocks.

5. The combination of claim 4 wherein said plurality of workpieces comprise workpieces of different configurations and wherein said task performing means comprises means for performing a predetermined task block on a corresponding workpiece of a predetermined configuration.

6. An automated system for performing a plurality of predetermined tasks on a plurality of workpieces at an actual task site, the system comprising:
  a stationary robot fixedly mounted at the actual task site; and
  a control system which controls said robot in the execution of the predetermined tasks, said control system including means for performing the plurality of predetermined tasks in a plurality of task blocks, said task block performing means including:
    means for teaching said robot off-line at a location different from the actual task site, and for storing, for each task block, information representing a plurality of teaching points describing the task performed in the respective task block;
    means for directly teaching said robot at the actual task site, and for storing, for each task block, information representing actual points corresponding to predetermined points of the teaching points in the respective task block;
    comparison means for comparing, for each task block, the actual point information and the corresponding teaching point information and for detecting, for each task block, differences between the actual point information and the corresponding teaching point information;
    correction means for correcting, for each task block,
      (i) the teaching point information corresponding to the actual points on the basis of the differences detected by said comparison means, and
      (ii) the teaching point information for teaching points not having a corresponding actual point on the basis of a calculation based on the differences detected by said comparison means; and
    means for storing and outputting, for each task block, the corrected teaching point information, and for controlling said robot in accordance with the output.

* * * * *